United States Patent Office 3,845,174
Patented Oct. 29, 1974

3,845,174
O,O-DIALKYL-O-(1,2-DIBROMO-2,2-DICHLORO-ETHYL)-THIONOPHOSPHORIC ACID ESTER
Wilhelm Sirrenberg, Sprockhovel, Westphalia, Wolfgang Behrenz and Ingeborg Hammann, Cologne, and Bernhard Homeyer, Opladen, Germany, assignors to Bayer Aktiengesellschaft, Leverkusen, Germany
No Drawing. Filed Aug. 15, 1973, Ser. No. 388,686
Claims priority, application Germany, Aug. 24, 1972,
P 22 41 625.7
Int. Cl. A01n 9/36; C07f 9/16
U.S. Cl. 260—963
8 Claims

ABSTRACT OF THE DISCLOSURE

O,O-dialkyl-O-(1,2 - dibromo - 2,2 - dichloroethyl)-thionophosphoric acid ester of the general formula $$(RO)_2\overset{S}{\overset{\|}{P}}-O-\overset{Br}{\underset{|}{C}H}-\overset{Br}{\underset{|}{C}}Cl_2 \quad (I)$$

in which
R is a straight-chain alkyl radical of 1 to 6 carbon atoms, preferably 1 to 3 carbon atoms,
which possess insecticidal, nematocidal and fungicidal properties.

---

The present invention relates to and has for its objects the provision of particular new O,O-dialkyl-O-(1,2-dibromo-2,2-dichloroethyl)-thionophosphoric acid esters which possess insecticidal, nematocidal and fungicidal properties, active compositions in the form of mixtures of such compounds with solid and liquid dispersible carrier vehicles, and methods for producing such compounds and for using such compound in a new way especially for combating pests, e.g. insects, nematodes and fungi, with other and further objects becoming apparent from a study of the within specification and accompanying examples.

It is known from Israeli Patent Specification 12,925 and German Published Specification DOS 1,567,076 that haloalkyl(thiono)-phosphoric acid esters, for example O,O-di-isopropyl-O - (1,2-dibromo-2,2-dichloroethyl)-thiono- (Compound c), O,O-dimethyl (Compound a) and O,O-diethyl-O - (1,2 - dibromo-2,2-dichloroethyl)-phosphoric acid esters (Compound b) possess insecticidal properties.

The present invention provides haloalkylthionophosphoric acid esters of the general formula $$(RO)_2\overset{S}{\overset{\|}{P}}-O-\overset{Br}{\underset{|}{C}H}-\overset{Br}{\underset{|}{C}}Cl_2 \quad (I)$$

in which
R is a straight-chain alkyl radical of 1 to 6 carbon atoms, preferably 1 to 3 carbon atoms.

Surprisingly, the haloalkylthionophosphoric acid esters according to the invention, of the formula (I), possess a substantially better insecticidal, especially soil-insecticidal, and nematocidal action than previously known compounds of analogous structure and of the same type of action. The new compounds can furthermore be employed not only against insects which are harmful to plants but also against hygiene pests and pests of stored products. The compounds according to the invention thus represent a genuine enrichment of the art. They furthermore contribute to meeting the great demand for constantly new active compounds in the field of pesticides. This demand arises from the fact that the commercially available agents have to meet constantly higher standards particularly in relation to the protection of the environment, for example low toxicity to warm-blooded animals and low phytotoxicity,, rapid degradation in and on the plant with short minimum intervals to be observed between spraying with pesticide and harvesting, and effectiveness against resistant pests.

The invention also provides a process for the production of a haloalkylthionophosphoric acid ester of the formula (I) in which (a) a dichlorovinylthionophosphoric acid ester of the general formula $$(RO)_2\overset{S}{\overset{\|}{P}}-O-CH=CCl_2 \quad (II)$$

is brominated, if desired in the presence of a catalyst, or (b) an O - (1,2-dibromo-2,2-dichloroethyl)-thionophosphoric acid ester dichloride of the formula $$\overset{Cl}{\underset{Cl}{\diagdown}}\overset{S}{\overset{\|}{P}}-O-\overset{Br}{\underset{|}{C}H}-\overset{Br}{\underset{|}{C}}Cl_2 \quad (III)$$

is reacted with an alcohol of the general formula $$ROH \quad (IV)$$

in which formulae (II) and (IV), R has the above-mentioned meaning.

If, for example, O,O-dimethyl-O-(2,2-dichlorovinyl)-thionophosphoric acid ester and bromine, or O-(1,2-dibromo-2,2-dichloroethyl)-thionophosphoric acid ester dichloride and methanol, are used as starting materials, the courses of the reaction can be represented by the following formula schemes:

(a)
$$(CH_3O)_2\overset{S}{\overset{\|}{P}}-O-CH=CCl_2 + Br_2 \longrightarrow$$

$$(CH_3O)_2\overset{S}{\overset{\|}{P}}-O-\overset{Br}{\underset{|}{C}H}-\overset{Br}{\underset{|}{C}}Cl_2$$
(I)   (V)

(b)
$$\overset{Cl}{\underset{Cl}{\diagdown}}\overset{S}{\overset{\|}{P}}-O-\overset{Br}{\underset{|}{C}H}-\overset{Br}{\underset{|}{C}}Cl_2 + 2\,CH_3OH \xrightarrow{-2\,HCl}$$

(IIIa)     (IVa)

$$(CH_3O)_2\overset{S}{\overset{\|}{P}}-O-\overset{Br}{\underset{|}{C}H}-\overset{Br}{\underset{|}{C}}Cl_2$$
(VI)

The following are preferred examples of thionophosphoric acid derivatives (II) and alcohols (IV) to be employed in the process: O,O-dimethyl-, O,O-diethyl- and O,O-di-n-propyl-O - (2,2-dichlorovinyl)-thionophosphoric acid ester, and methanol, ethanol and n-propanol.

Some of the dichlorovinylthionophosphoric acid esters to be used as starting substances are known from the literature and the alcohols are all known from the literature; the former can be prepared according to customary methods (compare, for example, German Offenlegungschrift (German Published Specification) 2,150,108). O-(1,2-dibromo-2,2-dichloroethyl) - thionophosphoric acid ester dichloride is obtainable, for example, from O-(2,2-dichlorovinyl)-thionophosphoric acid ester dichloride, described in German Published Specification DOS 2,150,108 by addition reaction with bromine.

The process variants (a) and (b) are preferably carried out in the presence of a solvent or diluent. As such, practically all inert organic solvents can be used. These include, in particular, aliphatic and aromatic hydrocarbons which are optionally chlorinated, such as benzene, toluene, xylene, benzine, methylene chloride, chloroform, carbon tetrachloride and chlorobenzene; ethers, for example diethyl ether, dibutyl ether and dioxane; ketones, for example acetone, methyl ethyl ketone, methyl isopropyl ketone and methyl isobutyl ketone; nitriles, such as acetonitrile and propionitrile; and alcohols, such as methanol, ethanol and propanol.

In both process variants, the reaction temperature can be varied within a wide range. In general, the reaction is carried out at 10 to 100, preferably at 20 to 50° C.

The reaction is generally carried out under normal pressure.

In carrying out process variant (a), the bromine is generally reacted in a 5 to 15% excess with the dichlorovinylthionophosphoric acid ester (II), optionally in the presence of a catalyst, for example azo-bis-isobutyric acid nitrile, and of one of the abovementioned solvents, preferably at the indicated temperatures. After completion of the reaction, excess bromine may be washed out with sodium bisulfite solution and the batch worked up in the usual manner. In process variant (b), the phosphoric acid dichloride (III) is reacted with the appropriate alcohol (IV), and an excess of the latter can serve as the solvent. The reaction mixture may be worked up according to customary methods.

The new compounds are in most cases obtained in the form of oils, some of which cannot be distilled without decomposition but can be freed of the last volatile constituents by so-called "slight distillation," that is to say prolonged heating under reduced pressure to moderately elevated temperatures, and can in this way be purified. They are characterized by their refractive indexes.

The structures of the substances were confirmed by analysis, IR-spectra and NMR-spectra.

As has already been mentioned, the haloalkylthionophosphoric acid esters according to the invention are distinguished by an excellent insecticidal and nematocidal activity against plant pests, hygiene pests and pests of stored products. They combine a low phytotoxicity with good action against sucking and biting insects, and in addition, for example, also possess a fungicidal activity.

For this reason, the compounds according to the invention may be successfully employed as pesticides in plant protection and in the field of hygiene and protection of stored products.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grade mealybug (*Pseudococcus maritimus*); thrips (*Thysanoptera*), such as *Hercinothrips femoralis*, and bugs for example the beet bug (*Piesmaquadrata*), the red cotton bug (*Dysdercus intermedus*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly and moth caterpillars (*Lepidoptera*) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutwordm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegonium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophae* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

When applied against hygiene pests and pests of stored products, particularly flies and mosquitoes, the compounds are distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usuable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carrier and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, hetones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, si i-cates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, nematocides and fungicides, or acaricides, rodenticides, bactericides, herbicides fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, nematodes and fungi, and more particularly methods of combating at least one of insects and nematodes, which comprises applying to at least one of correspondingly (a) such insects, (b) such nematodes, (c) such fungi, and (d) the corresponding habitat thereof, i.e. the locus to be protected, a correspondingly combative or toxic amount, i.e. an insecticidally, nematocidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

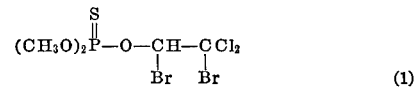

94.8 g. (0.4 mole) of O,O-dimethyl - O - (2,2-dichlorovinyl)-thionophosphoric acid ester and 2 g. of azo-bis-isobutyric acid nitrile were dissolved in 500 cm.$^3$ of carbon tetrachloride. A solution of 70 g. (0.43 mole) of bromine in 150 cm.$^3$ of carbon tetrachloride was added to the first solution at 20 to 30° C. After addition of the bromine, the batch was further stirred for 1.5 hours at 30° C. Excess bromine was removed with dilute aqueous sodium bisulfite solution and thereafter the reaction mixture was washed with water to which dilute sodium hydroxide solution was at the same time added until the wash water reacted neutral. The mixture was washed twice more with water and the organic phase was dried over sodium sulfate. After distilling off the solvent under reduced pressure, 124 g. (78% of theory) of O,O-dimethyl-O-(1,2-dibromo-2,2-dichloroethyl) - thionophosphoric acid ester were left in the form of an oil of refractive index $n_D^{20}=1.5446$. The compound was purified by distillation. It boiled at 113° C. under a pressure of 0.1 mm. Hg. The distilled product had a refractive index $n_D^{20}=1.5442$.

EXAMPLE 2

(a) 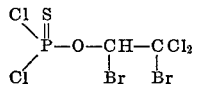

123 g. (0.5 mole) of O-(2,2-dichlorovinyl)-thionophosphoric acid ester dichloride, described in German Published Specification DOS 2,150,108, were dissolved in 200 cm.$^3$ of carbon tetrachloride. 80 g. (0.49 mole) of bromine were added dropwise to this solution at 20° C. over the course of one hour and after the slightly exothermic reaction had subsided the batch was left to stand for twelve hours. A slight turbidity of the solution was removed by filtration through kieselguhr. The volatile constituents were distilled off under reduced pressure. While this was done, dry air was briefly drawn through the apparatus. 196 g. (96.5% of theory) of O-(1,2-dibromo-2,2-dichloroethyl) - thionophosphoric acid ester dichloride were obtained as an oil. (The product could have been purified by distillation, if required.) It boiled at 90 to 92° C. under a pressure of 0.01 mm. Hg and had a refractive index $n_D^{20}=1.5850$.

(b) 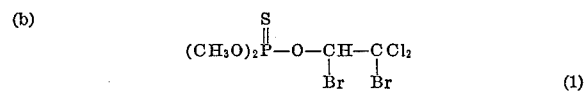

40.6 g. (3.75 mole) of O-(1,2-dibromo - 2,2 - dichloroethyl)-thionophosphoric acid ester dichloride were added dropwise to 120 g. (0.1 mole) of methanol. External cooling was used to ensure that the internal temperature of the mixture did not exceed 40° C. After the batch had stood for twelve hours, the excess methanol was distilled off under reduced pressure, the residue was taken up in methylene chloride, and the methylene chloride solution was twice washed with water and subsequently dried. After distilling off the solvent, 26 g. (65.5% of theory) of O,O-dimethyl-O-(1,2-dibromo - 2,2 - dichloroethyl) - thionophosphoric acid ester were obtained as an oily substance. The substance was thereafter purified by distillation. The distilled product, which boiled at 128° C./1 mm. Hg, had a refractive index $n_D^{20} = 1.5440$.

EXAMPLES 3–7

The following compounds were prepared in an analogous manner to that described in the preceding examples. The table below identifies the compounds by giving the meanings of R in formula (I).

| R | | Hm. Hg | Boiling point, ° C. | Refractive index, $n_D^{20}$ | Yield, percent of theory |
|---|---|---|---|---|---|
| (3) | $C_2H_5$ | 0.1 | 116 | 1.5290 | 67 |
| (4) | n-$C_3H_7$ | Slight distillation | | 1.5121 | 48.5 |
| (5) | n-$C_4H_9$ | Slight distillation | | 1.5089 | 47.5 |
| (6) | n-$C_5H_{11}$ | Slight distillation | | 1.5042 | 47 |
| (7) | n-$C_6H_{13}$ | Slight distillation | | 1.4959 | 40.5 |

In the biological Examples 8 to 13 which follow, the products according to the invention, identified by numbers corresponding to those of the preparative Examples 1–7, were compared with known compounds of analogous structure and identical type of action in respect of insecticidal and nematocidal activity.

The known compounds (a) to (c) are of the following formulae:

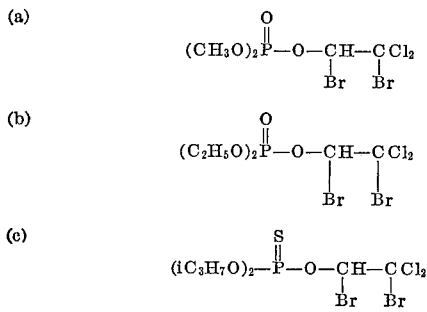

EXAMPLE 8

LT$_{100}$ test for Diptera

Test insects: *Aedes aegypti*
Solvent: Acetone 2 parts by weight of active compound were dissolved in 1000 parts by volume of solvent. The solution so obtained was diluted with further solvent to the desired lower concentrations.

2.5 ml. of the solution of active compound were pipetted into a Petri dish. On the bottom of the Petri dish there was a filter paper with a diameter of about 9.5 cm. The Petri dish remained uncovered until the solvent had completely evaporated. The amount of active compound per square meter of filter paper varied with the concentration of the solution of active compound used. About 25 test insects were then placed in the Petri dish and it was covered with a glass lid.

The condition of the test insects was continuously observed. The time which was necessary for a 100% destruction was determined.

The test insects, the active compounds, the concentrations of the active compounds and the periods of time at which there is a 100% destruction can be seen from the following Table 1.

TABLE 1
[LT$_{100}$ test for Diptera]

| Active compound | Active compound concentration of the solution in percent w./v. | LT$_{100}$, min. |
|---|---|---|
| (c) (Known) | 0.2 | 120 |
| | 0.04 | [1] 4 |
| (1) | 0.2 | 30 |
| | 0.04 | 60 |
| | 0.008 | 60 |
| | 0.0016 | 90 |
| | 0.00032 | 150 |
| | 0.000064 | [1] 6 |
| (3) | 0.2 | 30 |
| | 0.04 | 60 |
| | 0.008 | 90 |
| | 0.0016 | 150 |
| | 0.00032 | 210 |
| (4) | 0.2 | 60 |
| | 0.04 | 60 |
| | 0.008 | [1] 6 |
| (5) | 0.2 | 60 |
| | 0.04 | 105 |
| | 0.008 | [1] 6 |

[1] Hours.

EXAMPLE 9

LD$_{100}$ test

Test insects: *Sitophilus granarius*
Solvent: Acetone 2 parts by weight of the active compound were dissolved in 1,000 parts by volume of the solvent. The solution so obtained was diluted with further solvent to the desired concentrations.

2.5 ml. of the solution of the active compound were pipetted into a Petri dish. On the bottom of the Petri dish there was a filter paper with a diameter of about 9.5 cm. The Petri dish remained uncovered until the solvent had completely evaporated. The amount of active compound per square meter of filter paper varied with the concentration of the solution of active compound used. About 25 test insects were then placed in the Petri dish and it was covered with a glass lid.

The condition of the test insects was observed 3 days after the commencement of the experiments. The destruction in percent was determined.

The active compound, the concentrations of the active compounds, the test insects and the results can be seen from the following Table 2.

TABLE 2
[LD$_{100}$ test]

| Active compound | Active compound concentration of the solution in percent w./v. | Degree of destruction in percent |
|---|---|---|
| (c) (Known) | 0.2 | 75 |
| | 0.04 | 0 |
| (1) | 0.2 | 100 |
| | 0.04 | 100 |
| | 0.008 | 100 |
| | 0.0016 | 55 |
| (3) | 0.2 | 100 |
| | 0.04 | 100 |
| | 0.008 | 100 |
| | 0.0016 | 100 |
| (4) | 0.2 | 100 |
| | 0.04 | 100 |
| | 0.008 | 50 |
| (5) | 0.2 | 100 |
| | 0.04 | 85 |

EXAMPLE 10

LD$_{100}$ test

Test insects: *Trogoderma granarium* larvae
Solvent: Acetone 2 parts by weight of the active compound were dissolved in 1,000 parts by volume of the solvent. The solution so obtained was diluted with further solvent to the desired concentrations.

2.5 ml. of the solution of the active compound were pipetted into a Petri dish. On the bottom of the Petri dish there was a filter paper with a diameter of about 9.5 cm. The Petri dish remained uncovered until the solvent had completely evaporated. The amount of active compound per square meter of filter paper varied with the concentration of the solution of active compound used. About 25 test insects were then placed in the Petri dish and it was covered with a glass lid.

The condition of the test insects was observed 3 days after the commencement of the experiments. The destruction in percent was determined.

The active compound, the concentrations of the active compounds, the test insects and the results can be seen from the following Table 3.

TABLE 3
[LD$_{100}$ test]

| Active compound | Active compound concentration of the solution in percent w./v. | Degree of destruction in percent |
|---|---|---|
| (a) (Known) | 0.2 | 100 |
|  | 0.04 | 100 |
|  | 0.008 | 100 |
|  | 0.0016 | 0 |
| (b) (Known) | 0.2 | 100 |
|  | 0.04 | 100 |
|  | 0.008 | 100 |
|  | 0.0016 | 0 |
| (1) | 0.2 | 100 |
|  | 0.04 | 100 |
|  | 0.008 | 100 |
|  | 0.0016 | 100 |
| (3) | 0.2 | 100 |
|  | 0.04 | 100 |
|  | 0.008 | 100 |
|  | 0.0016 | 100 |

EXAMPLE 11

Ceratitis test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

2 ml. of the preparation of the active compound were pipetted onto a filter paper disc of about 10 cm. diameter. This was placed on a glass in which there were about 30 fruit flies (*Ceratitis capitata*) and covered with a glass plate.

After the specified periods of time, the destruction was determined as a percentage. 100% means that all the flies were killed. 0% means that none of the flies were killed.

The active compounds, the concentrations of the active compounds, the evaluation times and the results can be seen from the following Table 4.

TABLE 4
[Ceratitis test]

| Active compound | Active compound concentration in percent by weight | Degree of destruction in percent after 1 day |
|---|---|---|
| (a) (Known) | 0.0008 | 100 |
|  | 0.00016 | 95 |
|  | 0.000032 | 5 |
| (1) | 0.0008 | 100 |
|  | 0.00016 | 100 |
|  | 0.000032 | 100 |
|  | 0.0000064 | 100 |

EXAMPLE 12

Critical concentration test/soil insects

Test insect: Cabbage root fly maggots (*Phorbia brassicae*)
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration. The preparation of active compound was intimately mixed with the soil. The concentration of the active compound in the preparation was of practically no importance; only the amount by weight of active substance per unit volume of soil (given in p.p.m., i.e. mg./l.), was decisive. The soil was filled into pots and the pots were left to stand at room temperature. After 24 hours the test insects were introduced into the treated soil and after a further 48 hours the degree of action of the active compound was determined in percent by counting the dead and living test insects.

The degree of effectiveness was 100% when all test insects were killed and 0% if exactly as many test insects were alive as in the case of the control.

The active compounds, the amounts used and the results can be seen from Table 5 which follows.

TABLE 5
[*Phorbia brassicae*, maggots in soil]

| Active compound | Degree of destruction in percent at an active compound concentration of— | | | | | | |
|---|---|---|---|---|---|---|---|
|  | 40 p.p.m. | 20 p.p.m. | 10 p.p.m. | 5 p.p.m. | 2.5 p.p.m. | 1.25 p.p.m. | 0.625 p.p.m. |
| (a) (known) | 95 | 50 | 0 |  |  |  |  |
| (1) | 100 | 100 | 100 | 100 | 100 | 95 | 50 |
| (3) | 100 | 100 | 100 | 100 | 100 | 100 | 95 |
| (4) | 100 | 100 | 100 | 75 | 30 |  |  |

EXAMPLE 13

Critical concentration test/nematodes

Test nematode: *Meloidogyne incognita*
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration.

The preparation of active compound was intimately mixed with soil which was heavily infested with the test nematodes. The concentration of the active compound in the preparation was of practically no importance; only the amount of active compound per unit volume of soil, given in p.p.m., was decisive. The soil was filled into pots, lettuce was sown in and the pots were kept at a greenhouse temperature of 27° C. After 4 weeks, the lettuce roots were examined for infestation with nematodes, and the degree of effectiveness of the active compound was determined as a percentage. The degree of effectiveness was 100% when infestation was completely avoided; it was 0% when the infestation was exactly the same as in the case of the control plants in untreated soil which had been infested in the same manner.

The active compound, the amounts applied and the results can be seen from the following Table 6.

TABLE 6

[*Meloidogyne incognita*]

| Active compound | Degree of destruction in percent at an active compound concentration of— | | | | | |
|---|---|---|---|---|---|---|
| | 40 p.p.m. | 20 p.p.m. | 10 p.p.m. | 5 p.p.m. | 2.5 p.p.m. | 1.25 p.p.m. |
| (3) | 100 | 100 | 100 | 99 | 95 | 90 |
| (c) (known) | 0 | | | | | |

It will be appreciated that the instant specification and examples are set forth by way of illustration and not limitation, and that various modifications and changes may be made without departing from the spirit and scope of the present invention.

What is claimed is:

1. A haloalkylthionophosphoric acid ester of the formula

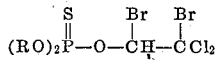

in which
R is a straight-chain alkyl radical of 1 to 6 carbon atoms.

2. An ester according to claim 1 in which R is a straight-chain alkyl radical of 1 to 3 carbon atoms.

3. The ester according to claim 1 wherein such ester is O,O-dimethyl - O-(1,2-dibromo-2,2-dichloroethyl)-triono-phosphoric acid ester of the formula

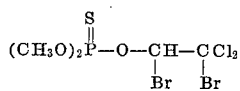

4. The ester according to claim 1 wherein such ester is O,O-diethyl-O-(1,2-dibromo-2,2-dichloroethyl)-thionophosphoric acid ester of the formula

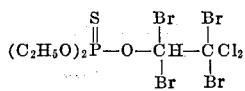

5. The ester according to claim 1 wherein such ester is O,O-di-n-propyl-O-(1,2-dibromo-2,2-dichloroethyl) - thiono-phosphoric acid ester of the formula

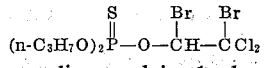

6. The ester according to claim 1 wherein such ester is O,O-di-n-butyl-O-(1,2-dibromo-2,2 - dichloroethyl) - thiono-phosphoric acid ester of the formula

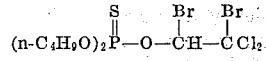

7. The ester according to claim 1 wherein such ester is O,O-di-n-pentyl-O-(1,2-dibromo-2,2-dichloroethyl)-thiono-phosphoric acid ester of the formula

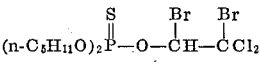

8. The ester according to claim 1 wherein such ester is O,O-di-n-hexyl-O-(1,2-dibromo-2,2-dichloroethyl) - thiono-phosphoric acid ester of the formula

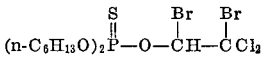

References Cited

UNITED STATES PATENTS 3,093,536    6/1963    Loeffler _____ 260—963 X

FOREIGN PATENTS 702,038    1/1965    Canada _____ 260—963

LORRAINE A. WEINBERGER, Primary Examiner

R. L. RAYMOND, Assistant Examiner

U.S. Cl. X.R.

424—225

UNITED STATES PATENT OFFICE
CERTIFICATE OF CORRECTION

Patent No. 3,845,174      Dated October 29, 1974

Inventor(s) Wilhelm Sirrenberg et al

It is certified that error appears in the above-identified patent and that said Letters Patent are hereby corrected as shown below:

Col. 3, lines 56-57, correct spelling of "inter-medius".

Col. 3, line 67, correct spelling of "cutworm".

Col. 4, line 75, change "hetones" to -- ketones --.

Col. 5, lines 6-7, correct spelling of "sili-cates".

Col. 7, line 23, in the Table heading, cancel "Hm. Hg"

and substitute -- mm Hg --.

Col. 12, claim 4, cancel the structural formula and substitute

Signed and sealed this 1st day of July 1975.

(SEAL)
Attest:

RUTH C. MASON
Attesting Officer

C. MARSHALL DANN
Commissioner of Patents
and Trademarks